(12) United States Patent
Tagami et al.

(10) Patent No.: US 9,086,951 B2
(45) Date of Patent: Jul. 21, 2015

(54) IMAGE READING APPARATUS

(71) Applicant: KYOCERA Document Solutions Inc., Osaka (JP)

(72) Inventors: Yuya Tagami, Osaka (JP); Kunihiko Shimamoto, Osaka (JP); Masaki Baba, Osaka (JP)

( * ) Notice: Subject to any disclaimer, the term of this patent is extended or adjusted under 35 U.S.C. 154(b) by 218 days.

(21) Appl. No.: 13/751,037

(22) Filed: Jan. 25, 2013

(65) Prior Publication Data

US 2013/0198483 A1    Aug. 1, 2013

(30) Foreign Application Priority Data

Jan. 26, 2012   (JP) .................................. 2012-013675

(51) Int. Cl.
*G06F 12/02* (2006.01)
*H04N 1/32* (2006.01)

(52) U.S. Cl.
CPC .......... *G06F 12/023* (2013.01); *H04N 1/32443* (2013.01); *H04N 1/32448* (2013.01); *G06F 2212/401* (2013.01); *H04N 2201/0081* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84; G06F 382/162332; G06K 9/36
See application file for complete search history.

(56) References Cited

U.S. PATENT DOCUMENTS

| | | | |
|---|---|---|---|
| 6,522,957 B1 * | 2/2003 | Sommer et al. ................... 701/1 |
| 7,299,384 B1 * | 11/2007 | Rodriguez-Rivera et al. .. 714/52 |
| 2007/0237405 A1 * | 10/2007 | Harada et al. ................. 382/232 |
| 2011/0305385 A1 * | 12/2011 | Kambegawa ................. 382/162 |
| 2012/0050763 A1 * | 3/2012 | Takeishi ........................ 358/1.9 |

FOREIGN PATENT DOCUMENTS

| | | |
|---|---|---|
| JP | H08-096141 A | 4/1996 |
| JP | 2005-086353 A | 3/2005 |
| JP | 2007-281823 A | 10/2007 |
| JP | 2007-286750 A | 11/2007 |

* cited by examiner

*Primary Examiner* — Jared Rutz
*Assistant Examiner* — Jean Edouard
(74) *Attorney, Agent, or Firm* — Ariel S. Bentolila; Bay Area IP Group LLC

(57) ABSTRACT

An image reading apparatus includes an image data compression unit, an attribute data compression unit, and a memory. Of image data and attribute data generated by image reading, the image data compression unit compresses the image data. The attribute data compression unit compresses the attribute data. In the memory, a page memory region for storing the image data compressed by the image data compression unit and the attribute data compressed by the attribute data compression unit is secured. And, one of the compressed image data and the compressed attribute data is successively written from the beginning of the page memory region toward the end thereof, while the other of the compressed image data and the compressed attribute data is successively written from the end of the page memory region toward the beginning thereof.

7 Claims, 6 Drawing Sheets

IMAGE READING APPARATUS

CROSS-REFERENCE TO RELATED APPLICATIONS

The present Utility patent application claims priority benefit of the Japanese patent number 2012-013675, filed on Jan. 26, 2012 under 35 U.S.C. 119(a). The contents of this related foreign patent application are incorporated herein by reference for all purposes to the extent that such subject matter is not inconsistent herewith or limiting hereof.

BACKGROUND

Field

The present invention relates to an image reading apparatus.

In an image reading apparatus, there are generated image data including a piece of image information for each pixel, such as RGB values, and attribute data including a piece of attribute information for each pixel, such as whether it belongs to a character region.

In a case where the image data and the attribute data are to be stored in a page memory after being compressed, a memory region is previously set for each of the image data and the attribute data, and in the memory region set, the image data and the attribute data after being compressed are stored, respectively.

The compression ratios for the image data and the attribute data vary depending upon, for example, the data content. Therefore, the aforementioned memory region is afforded a size large enough to store the image data and the attribute data, respectively, even when the compression ratio is the lowest. Thus, in the memory region, there occurs an unused portion according to the actual compression ratio.

Alternatively, it can be supposed to successively store the image data and the attribute data for each one band, however, in that case, the size of one band portion of image data after compression is unknown until the compression is completed, writing the attribute data cannot be started until the compression of the image data is completed, thereby there occurs a delay.

SUMMARY

In order to solve the aforementioned problems, the present invention has been made as follows.

An image reading apparatus according to one aspect of the present invention includes an image data compression unit, an attribute data compression unit, and a memory. Of image data and attribute data generated by image reading, the image data compression unit compresses the image data. The attribute data compression unit compresses the attribute data. In the memory, a page memory region for storing the image data compressed by the image data compression unit and the attribute data compressed by the attribute data compression unit is secured. And, one of the compressed image data and the compressed attribute data is successively written from the beginning of the page memory region toward the end thereof, while the other of the compressed image data and the compressed attribute data is successively written from the end of the page memory region toward the beginning thereof.

DETAILED DESCRIPTION OF THE EMBODIMENT

Hereinbelow, an embodiment of the present invention will be explained with reference to the drawings.

Figure 1:
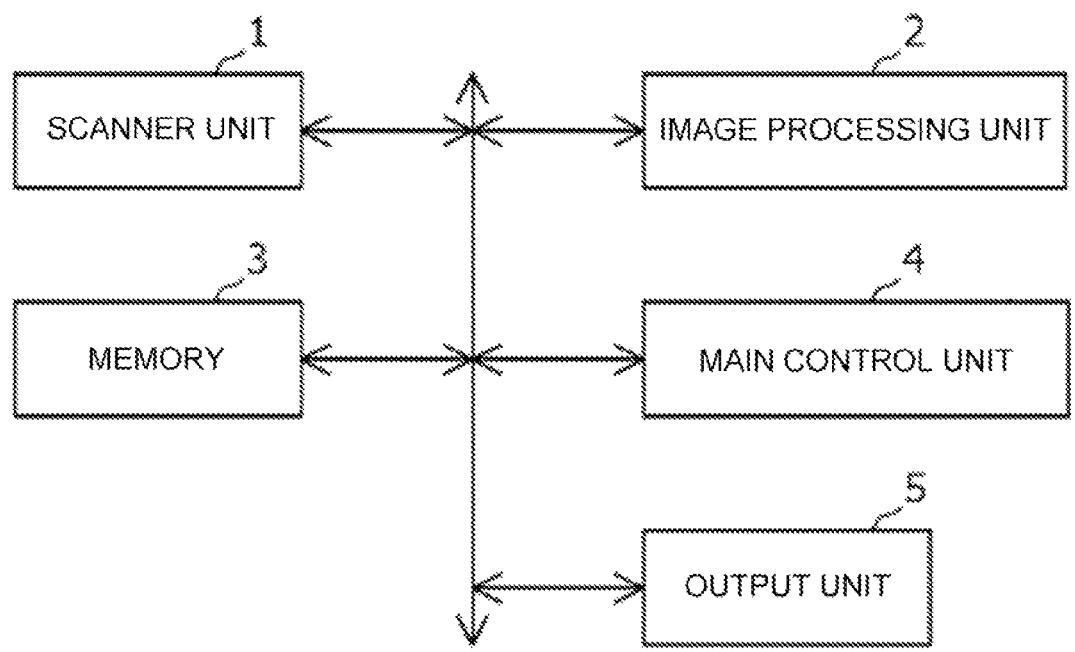
FIG. 1 is a block diagram illustrating a configuration of an image reading apparatus according to an embodiment of the present invention.

FIG. 1 is a block diagram illustrating a configuration of an image reading apparatus according to the embodiment of the present invention. The image reading apparatus shown in FIG. 1 has a scanner unit 1, an image processing unit 2, a memory 3, a main control unit 4, and an output unit 5, which are connected to one another.

The scanner unit 1 optically reads a page image of a document, and generates and outputs image data and attribute data for the page image. The image data provides data including a piece of image information for each pixel, such as RGB values, and the attribute data provides data including a piece of attribute information for each pixel, such as whether it belongs to a character region.

Further, the image processing unit 2 performs predetermined processing on the image data. The image processing unit 2 performs predetermined processing on the image data outputted by the scanner unit 1, or the image data outputted by the scanner unit 1 on which processing at a previous stage has been performed. The image processing unit 2 writes the image data after the predetermined processing to a predetermined memory region in the memory 3. The image processing unit 2 is constituted by, for example, one ASIC (Application Specific Integrated Circuit) or a plurality of ASIC's.

Further, the memory 3 is a volatile memory, such as a DRAM (Dynamic Random Access Memory). In the memory 3, a memory region which is required for processing by the image processing unit 2, and the like, is secured as appropriate.

Figure 2:
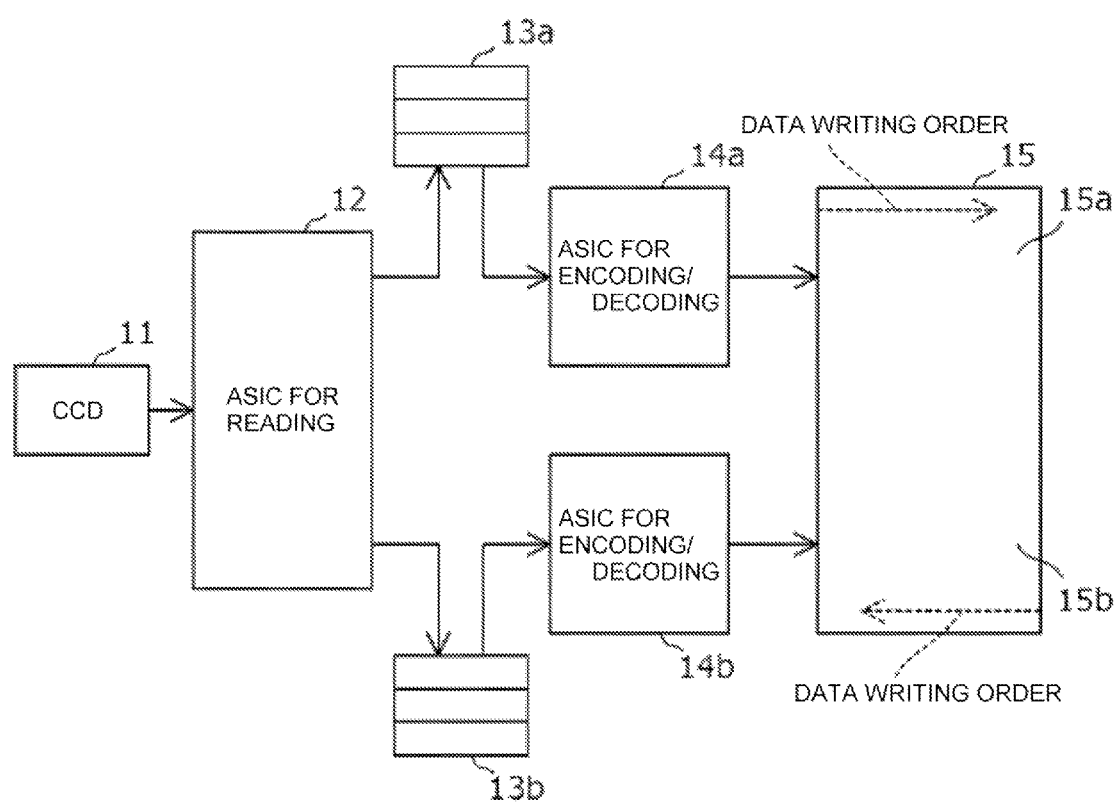
FIG. 2 is a block diagram for explaining various memory regions and a data flow in the image reading apparatus shown in FIG. 1.

FIG. 2 is a block diagram for explaining various memory regions and a data flow in the image reading apparatus shown in FIG. 1.

In FIG. 2, a CCD (Charge Coupled Device) 11 is an imaging device which outputs an optically obtained page image as an electric signal. An ASIC for reading 12 is a circuit for generating image data and attribute data from the electric signal from the CCD 11 and outputs them. The CCD 11 and the ASIC for reading 12 are included in the scanner unit 1.

A work memory region 13a is secured in the memory 3 for use as an output buffer for the ASIC for reading 12 and an input buffer for an ASIC for encoding 14a. The work memory region 13a has a plurality of buffer regions for use as a buffer for the image data, functioning as a double buffer or a ring buffer. The respective buffer regions have a size large enough to store one band portion of image data (fixed-length RAW data). One band is comprised of a predetermined number of lines.

A work memory region 13b is secured in the memory 3 for use as an output buffer for the ASIC for reading 12, and an input buffer for an ASIC for encoding 14b. The work memory region 13*b* has a plurality of buffer regions for use as a buffer for attribute data, functioning as a double buffer or a ring buffer. The respective buffer regions have a size large enough to store one band portion of attribute data (fixed-length RAW data).

The ASIC for encoding 14*a* is a circuit for performing compression of image data. The ASIC for encoding 14*a* performs compression of image data by the compression method, such as the JPEG (Joint Photographic Experts Group). The ASIC for encoding 14*a* performs compression of image data for each one band.

The ASIC for encoding 14*b* is a circuit for performing compression of attribute data. The ASIC for encoding 14*b* performs compression of attribute data by the compression method, such as the run length method. The ASIC for encoding 14*b* performs compression of attribute data for each one band.

The ASIC's for encoding 14*a* and 14*b* may be included in the scanner unit 1, or the image processing unit 2.

A page memory region 15 is a memory region which is secured in the memory 3 in order to store at least one page portion of image data compressed by the ASIC for encoding 14*a* and attribute data compressed by the ASIC for encoding 14*b*.

Figure 3:
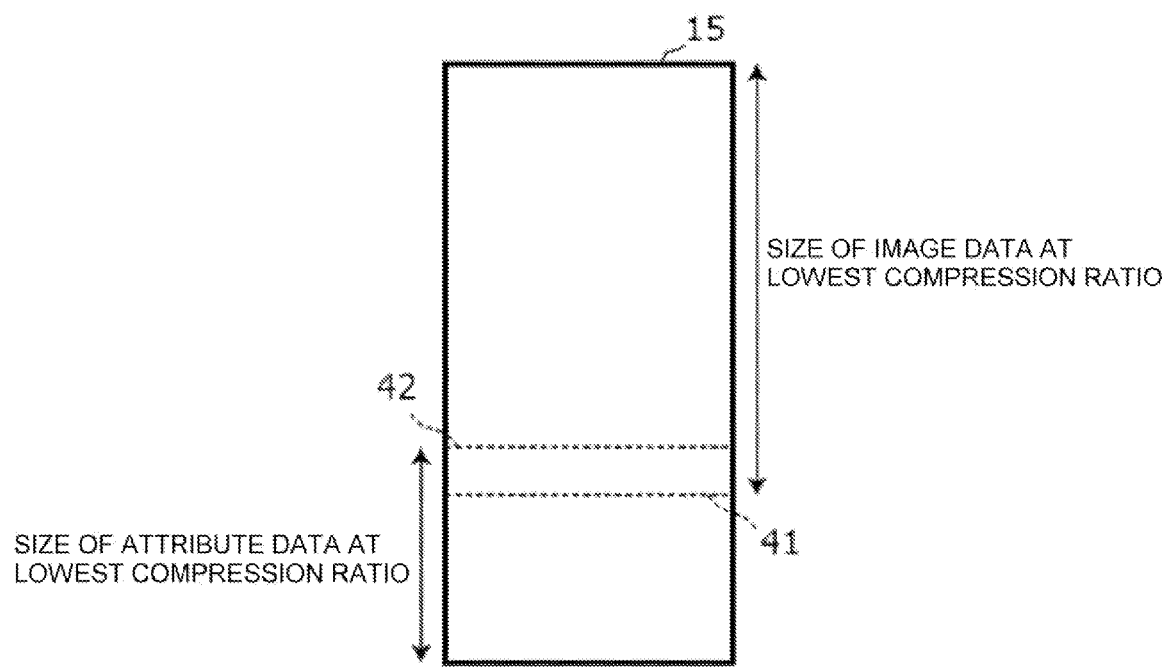
FIG. 3 is a drawing for explaining the size of the page memory region in FIG. 2.

FIG. 3 is a drawing for explaining the size of the page memory region 15 in FIG. 2. As shown in FIG. 3, the page memory region 15 is afforded a size which is smaller than the sum of the data size of image data corresponding to the lowest compression ratio (for example, 35 percent of the data size before compression) and the data size of attribute data corresponding to the lowest compression ratio (for example, 45 percent of the data size before compression). In other words, an end 41 of the image data that is given in a case where one page portion of image data compressed at the lowest compression ratio is written is located at an address lower than that of an end 42 of the attribute data that is given in a case where one page portion of attribute data compressed at the lowest compression ratio is written.

With reference back to FIG. 1, the main control unit 4 controls the scanner unit 1, the image processing unit 2, the memory 3, and the output unit 5. Further, the main control unit 4 secures the memory regions required by the image processing unit 2 (the work memory regions 13*a* and 13*b*, the page memory region 15, and the like) in the memory 3. Further, the output unit 5 outputs image data which has been subjected to image processing by the image processing unit 2.

The main control unit 4 specifies the writing locations for the compressed image data and the compressed attribute data to the ASIC's for encoding 14*a* and 14*b*. Further, the main control unit 4 monitors the writing location for the compressed image data and the writing location for the compressed attribute data, and detects a lack of free space in the page memory region 15.

For example, the main control unit 4 monitors the size between the writing location for the compressed image data and the writing location for the compressed attribute data, and when the size is reduced to under a predetermined value (for example, the sum of the size of one band portion of image data corresponding to the lowest compression ratio for the image data and the size of one band portion of attribute data corresponding to the lowest compression ratio for the attribute data), determines that the page memory region 15 is out of free space.

Alternatively, for example, when the end of one of the image data and attribute data exceeds the end of the other, the main control unit 4 determines that the page memory region 15 is out of free space.

In accordance with the specification of writing locations by the main control unit 4, the ASIC for encoding 14*a* successively writes the compressed image data in increments of one band from the beginning of the page memory region 15 toward the end thereof, while the ASIC for encoding 14*b* successively writes the compressed attribute data in increments of one band from the end of the page memory region 15 toward the beginning thereof.

Figure 4:
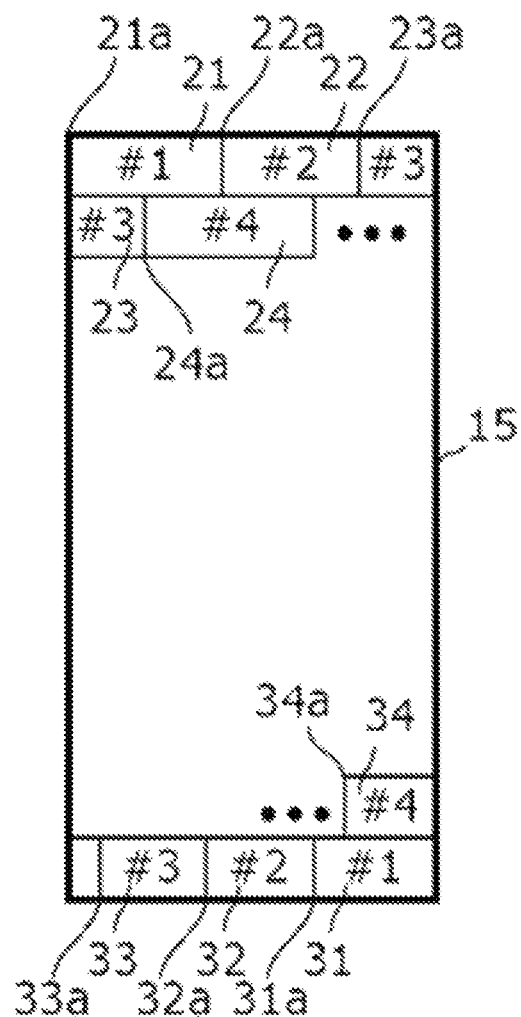
FIG. 4 is a drawing giving an example of image data and attribute data written in the page memory region in FIG. 2.

FIG. 4 is a drawing giving an example of image data and attribute data written in the page memory region 15. As shown in FIG. 4, a first band of image data 21 is written from a writing location 21*a*; a second band of image data 22 is written from a writing location 22*a*; a third band of image data 23 is written from a writing location 23*a*; and a fourth band of image data 24 is written from a writing location 24*a*. Further, a first band of attribute data 31 is written from a writing location 31*a*; a second band of attribute data 32 is written from a writing location 32*a*; a third band of attribute data 33 is written from a writing location 33*a*; and a fourth band of attribute data 34 is written from a writing location 34*a*.

The image data and the attribute data which have been stored in the page memory region 15 are read out and expanded, and then subjected to predetermined image processing by the image processing unit 2. The main control unit 4 manages the writing location and size of each band of image data (compressed) and attribute data (compressed), and the main control unit 4 specifies the reading location and size of each band of image data (compressed) and attribute data (compressed) to the image processing unit 2.

Next, the operation of the above-described image reading apparatus will be explained.

The main control unit 4 secures the page memory region 15, setting the address information (the lead head address and the size, or the lead head address and the end address) thereabout in the ASIC's for encoding 14*a* and 14*b*, and further, secures the work memory regions 13*a* and 13*b*, setting the address information (the lead head address and the size, or the lead head address and the end address) about the work memory regions 13*a* and 13*b* in the ASIC for reading 12 and the ASIC's for encoding 14*a* and 14*b* as appropriate.

And, the ASIC for encoding 14*a* and the ASIC for encoding 14*b* operate in parallel as follows.

For each one band portion of image data, the main control unit 4 gives a compression command to the ASIC for encoding 14*a*, and notifies it of the writing starting location for the image data after compression. After the compression, the ASIC for encoding 14*a* notifies the main control unit 4 of the size of the one band portion of image data after the compression, and, from the size and the writing starting location of the band, the main control unit 4 identifies the writing starting location for the next band of image data.

In accordance with the compression command and the writing starting location from the main control unit 4, the ASIC for encoding 14*a* reads one band portion of image data from the work memory region 13*a* to compress it, and writes the one band portion of compressed image data to the page memory region 15.

On the other hand, for each one band portion of attribute data, the main control unit 4 gives a compression command to the ASIC for encoding 14*b*, and notifies it of the writing starting location for the attribute data after compression. After the compression, the ASIC for encoding 14*b* notifies the main control unit 4 of the size of the one band portion of attribute data after the compression, and, from the size of the band and the writing starting location of a band immediately preceding the band, the main control unit 4 identifies the writing starting location for the band of attribute data.

In accordance with the compression command and the writing starting location from the main control unit 4, the ASIC for encoding 14b reads one band portion of attribute data from the work memory region 13b to compress it, and writes the one band portion of compressed attribute data to the page memory region 15.

The size of one band portion of image data before compression is definite, however, the size of one band portion of compressed image data is not definite. Each band of compressed image data is successively written with no gap to the immediately preceding band of compressed image data. Likewise, the size of one band portion of attribute data before compression is definite, however, the size of one band portion of compressed attribute data is not definite. Each band of compressed attribute data is successively written with no gap to the immediately preceding band of compressed attribute data.

And, the main control unit 4 monitors the writing terminating location for the band of image data written last at the moment and the writing starting location for the band of attribute data written last at the moment in the page memory region 15, and on the basis of those locations, determines whether or not the page memory region 15 is out of free space.

In a case where there occurs a lack of free space before one page portion of compressed image data and compressed attribute data is written in the page memory region 15, the main control unit 4 resecures a large enough size for the page memory region 15, for example, and then again executes writing of one page portion of compressed image data and compressed attribute data.

In a case where there occurs no lack of free space before one page portion of compressed image data and compressed attribute data is written in the page memory region 15, the image processing unit 2 reads out one page portion of image data and attribute data from the page memory region 15, and then the compressed image data and compressed attribute data for the next page are written in order and in the same manner from the beginning and the end of the page memory region 15.

Figure 5A:
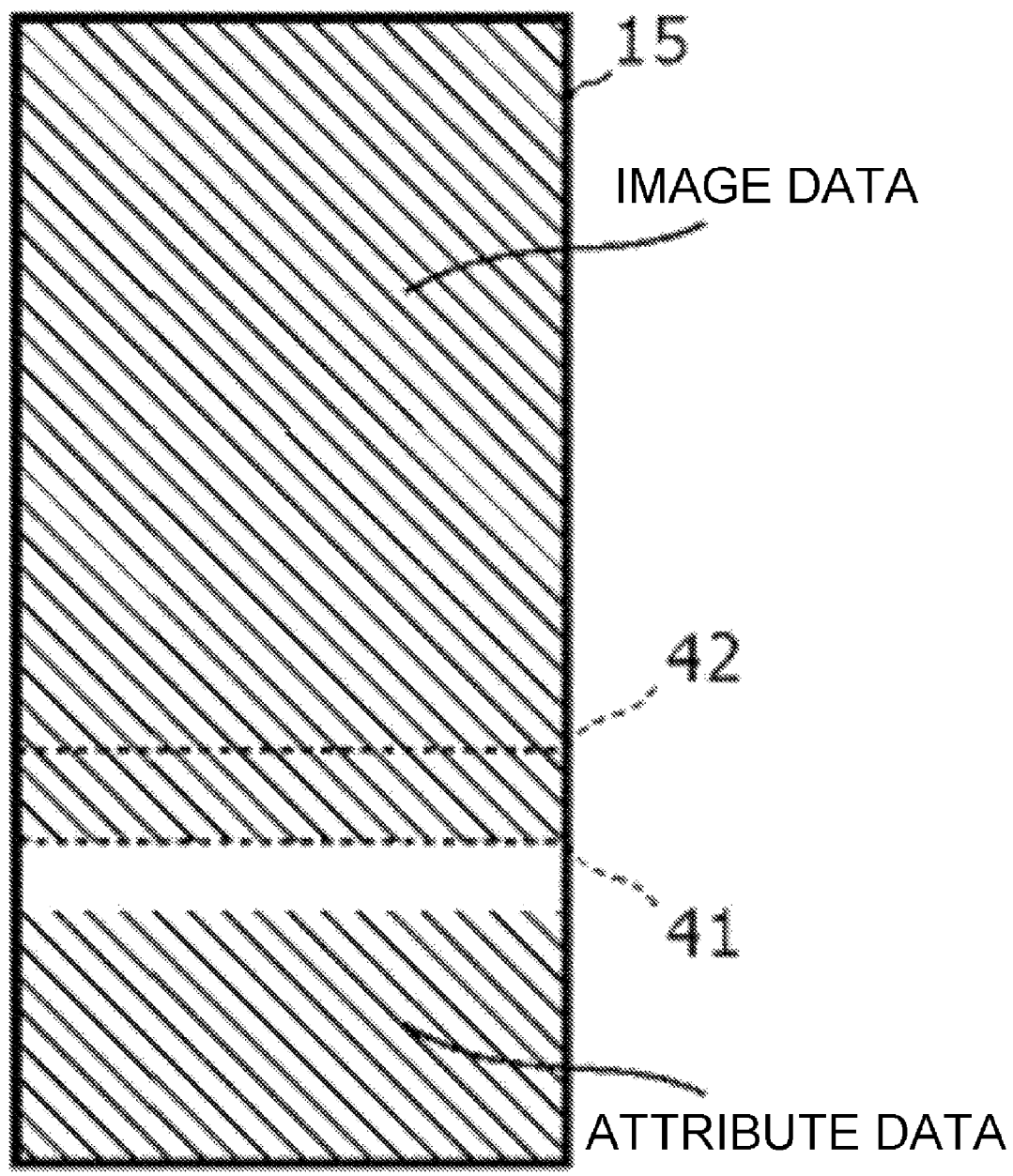
FIGS. 5(A) and 5(B) are each a drawing showing an example of status of the page memory region in FIG. 2 after one page portion of image data and attribute data having been written.
Figure 5B:
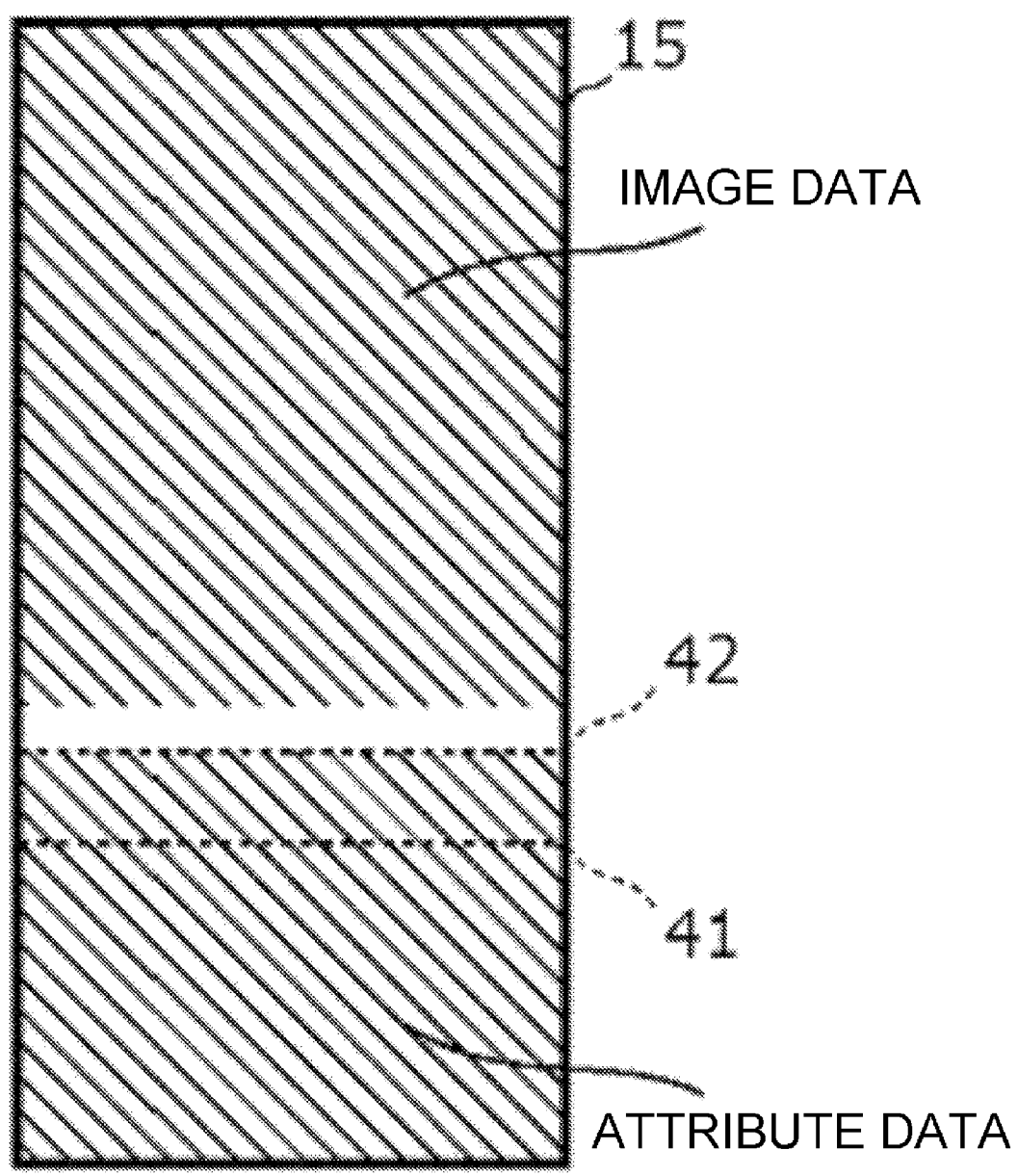

FIGS. 5A and 5B are each a drawing showing an example of status of the page memory region 15 after one page portion of image data and attribute data having been written. FIG. 5A is a drawing showing an example of status of the page memory region 15 in a case where the size of the attribute data is small enough, and the size of the image data is the size corresponding to the lowest compression ratio, while FIG. 5B is a drawing showing an example of status of the page memory region 15 in a case where the size of the image data is small enough, and the size of the attribute data is the size corresponding to the lowest compression ratio.

As shown in FIG. 5A and FIG. 5B, if either of the sizes of the image data and the attribute data after compression is small enough, the page memory region 15 will have a sufficient free space, thereby no lack of free space will be caused in the page memory region 15.

Thus, according to the above-described embodiment, the scanner unit 1 performs image reading for generating and outputting image data and attribute data. And, the ASIC for encoding 14a compresses the image data, while the ASIC for encoding 14b compresses the attribute data. The compressed image data and the compressed attribute data are stored in the page memory region 15 which has been secured in the memory 3. At that time, one of the compressed image data and the compressed attribute data is successively written from the beginning of the page memory region 15 toward the end thereof, while the other of the compressed image data and the compressed attribute data is successively written from the end of the page memory region 15 toward the beginning thereof.

And, as described above, in a case where there occurs a lack of free space before one page portion of compressed image data and compressed attribute data is written in the page memory region 15, the main control unit 4 resecures a large enough size for the page memory region 15, for example, and then again executes writing of one page portion of compressed image data and compressed attribute data.

Thereby, there will not be caused a state in which further writing is impossible due to a lack of free space in the page memory region, even if the compressed image data and the compressed attribute data are stored in the page memory region having a small size, as compared to the total size of the page memory regions in a case where, for each of the compressed image data and the compressed attribute data, a page memory region is individually secured. This will lead to an increased utilization rate for the page memory region.

The above-described embodiment is a preferred embodiment of the present invention, however, the present invention is not limited thereto, and can be subjected to various modifications and alterations within the spirit of the present invention.

For example, in the above-described embodiment, the image data is written from the beginning of the page memory region 15 toward the end thereof, while the attribute data being written from the end of the page memory region 15 toward the beginning thereof, however, contrarily to this, the attribute data may be written from the beginning of the page memory region 15 toward the end thereof, while the image data being written from the end of the page memory region 15 toward the beginning thereof.

Further, the ASIC's for encoding 14a and 14b in the above-described embodiment may be adapted to be a single ASIC.

The present invention is applicable to, for example, scanners, copying machines, compound machines, and the like, having an image reading function.

What is claimed is:

1. An image reading apparatus, comprising:
   an image data compression unit for compressing, of image data and attribute data generated by image reading, the image data;
   an attribute data compression unit for compressing the attribute data;
   a memory for securing a page memory region to store the image data compressed by the image data compression unit and the attribute data compressed by the attribute data compression unit,
   one of the compressed image data and the compressed attribute data being successively written from the beginning of the page memory region toward the end thereof, while the other of the compressed image data and the compressed attribute data being successively written from the end of the page memory region toward the beginning thereof,
   an end of one of the image data and the attribute data that is given in a case where one page portion of one of the image data and the attribute data compressed at the lowest compression ratio is located at an address lower than that of an end of other of the image data and the attribute data that is given in a case where one page portion of other of the image data and the attribute data compressed at the lowest compression ratio; and
   a control unit for specifying a writing location for the compressed image data and the compressed attribute data, respectively, and for determining that the page memory region is out of free space when size is reduced to under sum of size of one band portion of the image data corresponding to the lowest compression ratio for the image data and size of one band portion of the attribute data corresponding to the lowest compression ratio for the attribute data and when the end of one of the image data and the attribute data exceeds the end of the other.

2. The image reading apparatus of claim 1, wherein the control unit monitors the writing location for the compressed image data and the writing location for the compressed attribute data, and detects a lack of free space in the page memory region.

3. The image reading apparatus of claim 2, wherein, upon the writing location for the compressed image data exceeding the end of the attribute data in a case where one page portion of the compressed image data has been written at the lowest compression ratio, or upon the writing location for the compressed attribute data exceeding the end of the image data in a case where one page portion of the compressed attribute data has been written at the lowest compression ratio, the control unit detects a lack of free space in the page memory region.

4. The image reading apparatus of claim 2, wherein the control unit monitors the size between the writing location for the compressed image data and the writing location for the compressed attribute data, and upon the size being reduced to under a predetermined value, detects a lack of free space in the page memory region.

5. The image reading apparatus of claim 1, wherein
the image data and the attribute data are compressed for each one band,
the compressed image data of a plurality of bands are successively written in the page memory region, and
the compressed attribute data of the plurality of bands are successively written in the page memory region.

6. The image reading apparatus of claim 1, wherein
the image data compression unit successively writes the compressed image data from the beginning of the page memory region toward the end thereof, and
the attribute data compression unit successively writes the compressed attribute data from the end of the page memory region toward the beginning thereof.

7. The image reading apparatus of claim 1, wherein
the page memory region has a small size, as compared to the total size of one page portion of the image data compressed at the lowest compression ratio and one page portion of the attribute data compressed at the lowest compression ratio.

* * * * *